J. A. BURCHARD.
Hand-Seeder.

No. 55,612.

Patented June 19, 1866.

Witnesses.

Inventor.
John A Burchard.

UNITED STATES PATENT OFFICE.

JOHN A. BURCHARD, OF BELOIT, WISCONSIN.

IMPROVEMENT IN HOE AND CORN-PLANTER COMBINED.

Specification forming part of Letters Patent No. 55,612, dated June 19, 1866.

*To all whom it may concern:*

Be it known that I, J. A. BURCHARD, of Beloit, in the county of Rock and State of Wisconsin, have invented certain new and useful Improvements in Hoe Corn-Planters; and I do hereby declare that the following is a full and complete description of the construction and operation of the same, reference being had to the accompanying drawings, making a part of this specification, in which—

Figure 1:
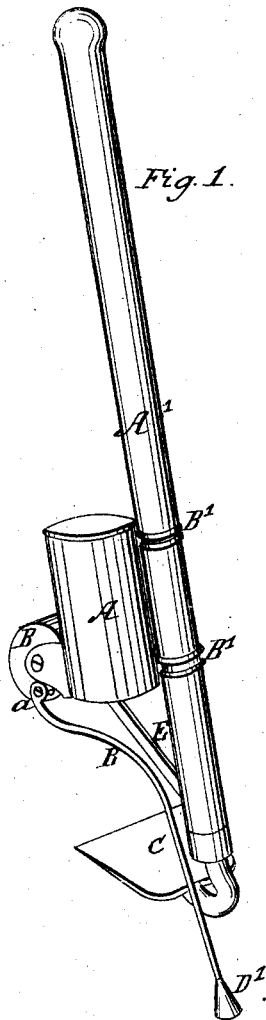
Figure 2:
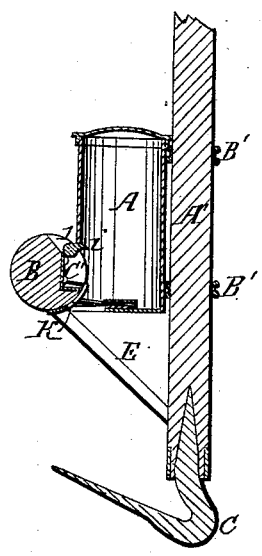
Figure 3:
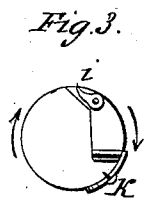

Figure 1 is a perspective view. Fig. 2 is a vertical section. Fig. 3 is a detached view that will be referred to in the description.

Like letters of reference refer to like parts in the views.

In the drawings, A is the cylinder, which can be made of tin or any suitable material, and is connected or attached to the handle A' by means of the rings B', that extend round said handle. To the end of this handle is connected the hoe C. A portion of one side and end of the cylinder is removed to receive the roller B, the portion at the side being divided in the center and bent out, forming projections, in which the roller has its bearings, the side of the cylinder next the roller being left open. Upon the convex surface of this roller B, and about the same distance from each end of it, is an adjustable cup, C', into which the corn or seed falls from the cylinder A.

D is a rod attached at one end to the roller B by means of the screw a', extending down and passing through an eye or loop, b, fastened to the hoe or other implement in use, and ending in a cone formed by covering the rod with some metal, or in a circular plate of metal at right angles to the rod.

E is a spring, which can be made in any suitable manner, attached at one end to the roller B, and the other to the handle A', as shown in the drawings.

When it is desired to drop the corn, grain, or seed, the end D' of the rod D must be pressed slightly upon the ground, thus pushing the rod D up, which being attached to the roller B, as before stated, turns the roller until the cup or cavity C' is brought out from under the cylinder and its contents drop to the ground. The hoe is then lifted to cover the seed, which relieves the pressure on the rod D, and the spring E forces the roller B back to its position, bringing the cup or cavity C' within the cylinder.

Fastened at the bottom of the cylinder is an elastic brush, H, which the roller B revolves against, and it also aids in gaging a uniform quantity of seed to be sown. As the roller B is turned in the direction indicated by the arrows in Fig. 3 the stirrer I presses against the seed and is turned back, so that it is placed below the surface of the roller, except a portion at the point. When the roller is thrown back so as to bring the cavity ready to be filled the point i strikes against the seed and puts the point in the position seen in Fig. 3.

K is a gage-plate for changing the capacity of the cup C' for planting any desired quantity.

What I claim as my improvement, and desire to secure by Letters Patent, is—

The rod D, hoe C, spring E, and roller B, in combination with the stirrer I, gage-plate K, and cylinder A, as and for the purpose set forth.

JOHN A. BURCHARD.

Witnesses:
  P. W. HALL,
  JESSE BURCHARD.